United States Patent [19]

Matsumoto et al.

[11] 4,165,728

[45] Aug. 28, 1979

[54] DECOMPRESSING DEVICE TO BE USED IN ENGINES FOR PRIME MOVER-EQUIPPED BICYCLES AND THE LIKE

[75] Inventors: Shigeo Matsumoto, Niiza; Sadashi Yamamoto, Wako; Masaki Watanabe, Niiza, all of Japan

[73] Assignee: Honda Giken Kogyo Kabushiki Kaisha, Tokyo, Japan

[21] Appl. No.: 830,822

[22] Filed: Sep. 6, 1977

[30] Foreign Application Priority Data

Sep. 14, 1976 [JP] Japan ................................ 51-110425

[51] Int. Cl.[2] .......................... F01L 13/08; B62D 3/00

[52] U.S. Cl. .................................... 123/182; 180/206; 180/219

[58] Field of Search ............ 123/182; 180/33 C, 33 R

[56] References Cited

U.S. PATENT DOCUMENTS

| | | | |
|---|---|---|---|
| 717,623 | 1/1903 | Riotte | 123/182 |
| 726,226 | 4/1903 | Krastin | 123/182 |
| 2,583,499 | 1/1952 | Teegen | 180/33 C |
| 3,901,199 | 8/1975 | Smith | 123/182 |

*Primary Examiner*—Charles J. Myhre
*Assistant Examiner*—M. Moy
*Attorney, Agent, or Firm*—Irving M. Weiner; Pamela S. Austin; Melvin Yedlin

[57] ABSTRACT

A decompressing device adapted for use in engines for prime mover-equipped bicycles. The decompressing device is operatively connected with the shifting operation of changing the bicycle running over to the engine power running, and the decompressing operation is automatically performed within a predetermined period in the initial starting period of the engine. The decompression is performed simply, and automatically, without requiring special skill and technique.

6 Claims, 10 Drawing Figures

DECOMPRESSING DEVICE TO BE USED IN ENGINES FOR PRIME MOVER-EQUIPPED BICYCLES AND THE LIKE

The present invention relates to decompressing devices adapted to be used in engines for vehicles such as prime mover-equipped bicycles.

More particularly, the invention relates to a decompressing device whereby operations of stopping and starting an engine are related to each other so that, even if the starting operation is made, only in the initial starting period, a decompressing operation may be automatically made for a predetermined time to facilitate starting the engine. The invention further relates to a decompressing device which makes such decompression simply, positively and automatically, without requiring any special operation, is adapted to prime mover-equipped bicycles, and facilitates starting the engine without requiring any special skill and technique when applied to such vehicles.

BACKGROUND OF THE INVENTION

In a prime mover-equipped bicycle, when changing a bicycle running over to an engine running, when the crankshaft is driven by artificially operating the pedal to start the engine, the resistance at the time of the compression stroke of the piston will be transmitted to the pedal and, if no sufficient inertia is given to the crankshaft, the engine will be difficult to start and will be required special skill and technique.

Therefore, there has been suggested a decompressing device whereby the pressure in the cylinder is reduced in the initial starting period of the engine so that the crankshaft may be smoothly rotated in the initial period, and when a sufficient rotating inertia is given, the pressure reduction will be stopped so that thereafter a compression may be easily made by the inertia to secure starting of the engine.

When such decompressing device is applied to a prime mover-equipped bicycle, such problems as discussed hereinbelow will be produced in operating the decompressing device.

Because the decompressing operation is made with a lever or the like separately from the engine starting and speed change, it will be necessary to separately perform a decompressing operation at the time of the starting operation, and the operation will be difficult and complicated. It will also be necessary to return the lever properly in time with the starting and special skill and technique will be required for the operation. Such operations are undesirable in instances in which such vehicles, i.e., prime mover-equipped bicycles, are operated by females and children. It is desired that the engine can be positively started while being simply and easily decompressed, even by females and children.

SUMMARY OF THE INVENTION

The present invention provides a decompressing device which includes a decompression valve resiliently pressed in the closing direction by a spring. Also provided are means for switching an engine on and off, and a starting shaft for starting the engine. An operating member is operatively connected to and operated in conjunction with the means for switching the engine on and off, and opening the decompression valve against the spring. A cam is provided on the starting shaft coaxially with the operating member, and the decompressing operation of the decompression valve is regulated and released through the operating member by relative movement with the cam.

Such problems as difficulty in starting the engine of prime mover-equipped bicycles and the operability of the decompressing device provided to facilitate starting the engine, are effectively solved by the present invention.

An object of the present invention is to provide a decompressing device which is operated relative to the operation of changing the operation and stop of an engine over to each other to automatically decompress the cylinder for a predetermined period, without requiring any special decompressing operation to start the engine.

Another object of the invention is to provide a decompressing device wherein, in a prime mover-equipped bicycle or the like, a decompression is automatically made in the initial starting period of the engine as operatively connected with the operating system of changing the start and stop of the engine over to each other. Therefore, it is completely unnecessary to perform any special complicated and troublesome operations, and special skill and technique in performing decompression returning operations properly timed with the starting is not required and the engine can be started simply, easily and positively.

The present invention provides a decompressing device comprising a cam rotating integrally with a starting shaft and an operating member engaging with the cam and related to a resiliently pressed decompression valve through a connecting member. The operating member is operatively connected with an operating piece starting and stopping the engine. The decompression valve is opened for a predetermined period of the initial starting period of the engine through the cam by the rotation of the starting shaft selectively engaged with the crankshaft by a clutch means to make a decompression action and to regulate an operating system for returning the decompression valve.

Thus, the present invention provides a decompressing device wherein the structure is simple, the operation is regulated by a cam provided on a starting shaft, and the device is therefore positive and highly reliable. Further, the operating system is also operatively connected with the engine starting operation system, to thus automate the above-mentioned decompressing operation. The structure of the decompressing operation system is simplified, generally the number of component parts is reduced, the cost is reduced, and the practicability as applied to prime mover-equipped bicycles is very high.

The present invention provides a decompression device which is high in operability as applied to prime mover-equipped bicycles, facilitates starting the engine, and elevates the practicability of prime mover-equipped bicycles to also be used by females and children.

A preferred embodiment of the present invention shall be explained in detail in the following description, with reference being had to the accompanying drawings. Further objects and advantages of the present invention will become clear from the following description.

DETAILED DESCRIPTION

The embodiment described hereinbelow is of the decompressing device in accordance with the present invention, as applied to a prime mover-equipped bicycle.

Figures 9, 10:
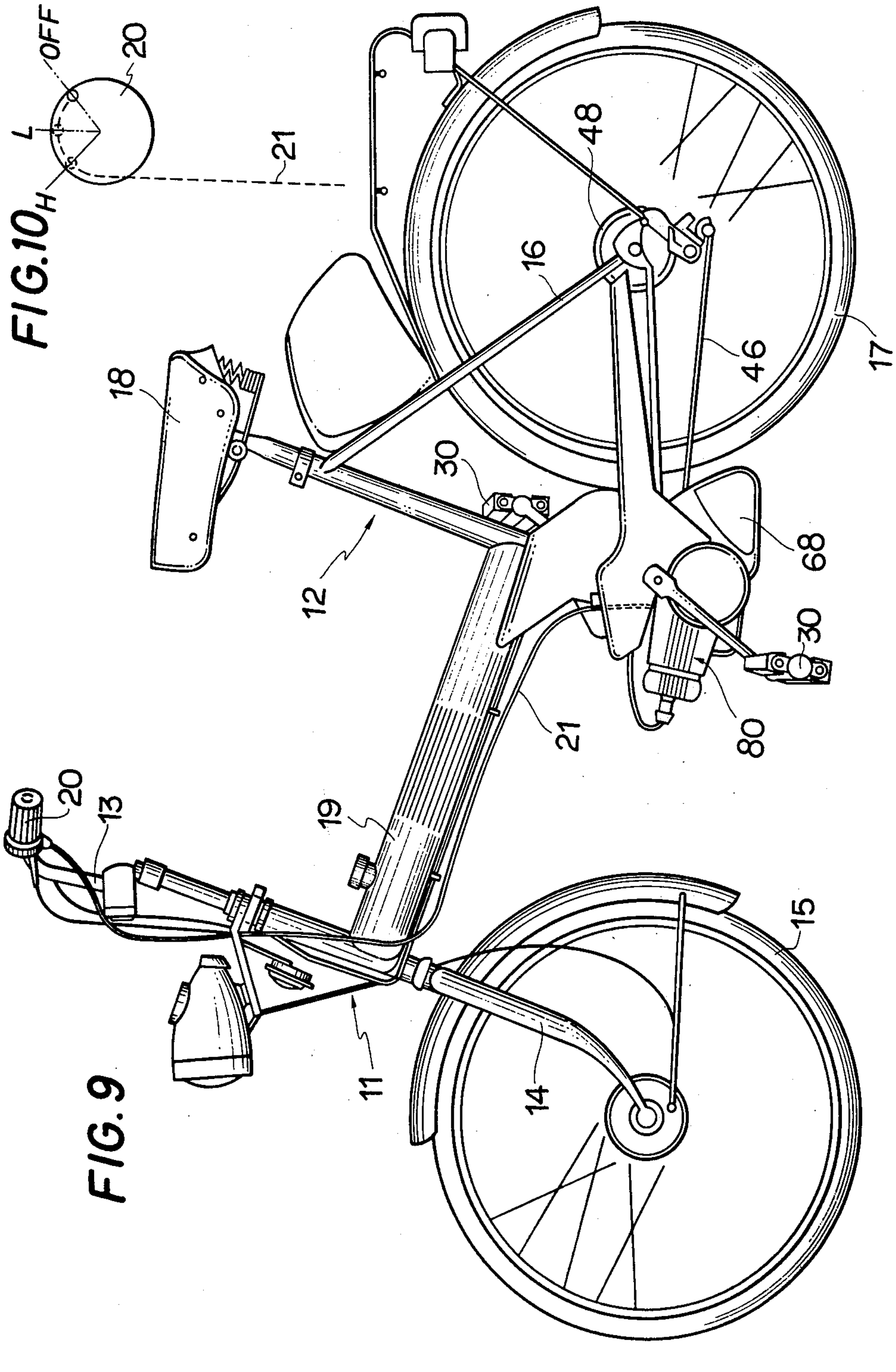
FIG. 9 is a view showing a prime mover-equipped bicycle.
FIG. 10 is an explanatory view showing the movement of a changing operation piece.

FIG. 9 shows a prime mover-equipped bicycle to which the present invention is applied. A prime mover-equipped bicycle 11 is provided in the front part of its frame body 12 with a front fork 14 operated by a handle 13 and in the rear part with a rear fork 16. The front fork 14 and rear fork 16 support respectively a front wheel 15 and rear wheel 17. A change grip 20, which is a hand grip for making a changing operation, is provided at one end of the handle 13. Numeral 18 indicates a riding seat and 19 indicates a fuel tank. The change grip 20 is connected with a speed changing means of a power transmitting device (discussed in detail below) through a change wire 21.

The decompressing device is operatively connected with a means of changing a bicycle running with pedals and an engine power running over to each other and is applied to a prime mover-equipped bicycle provided with two power systems. The power transmitting device shall be explained with reference to FIGS. 1 and 2.

Figure 2:
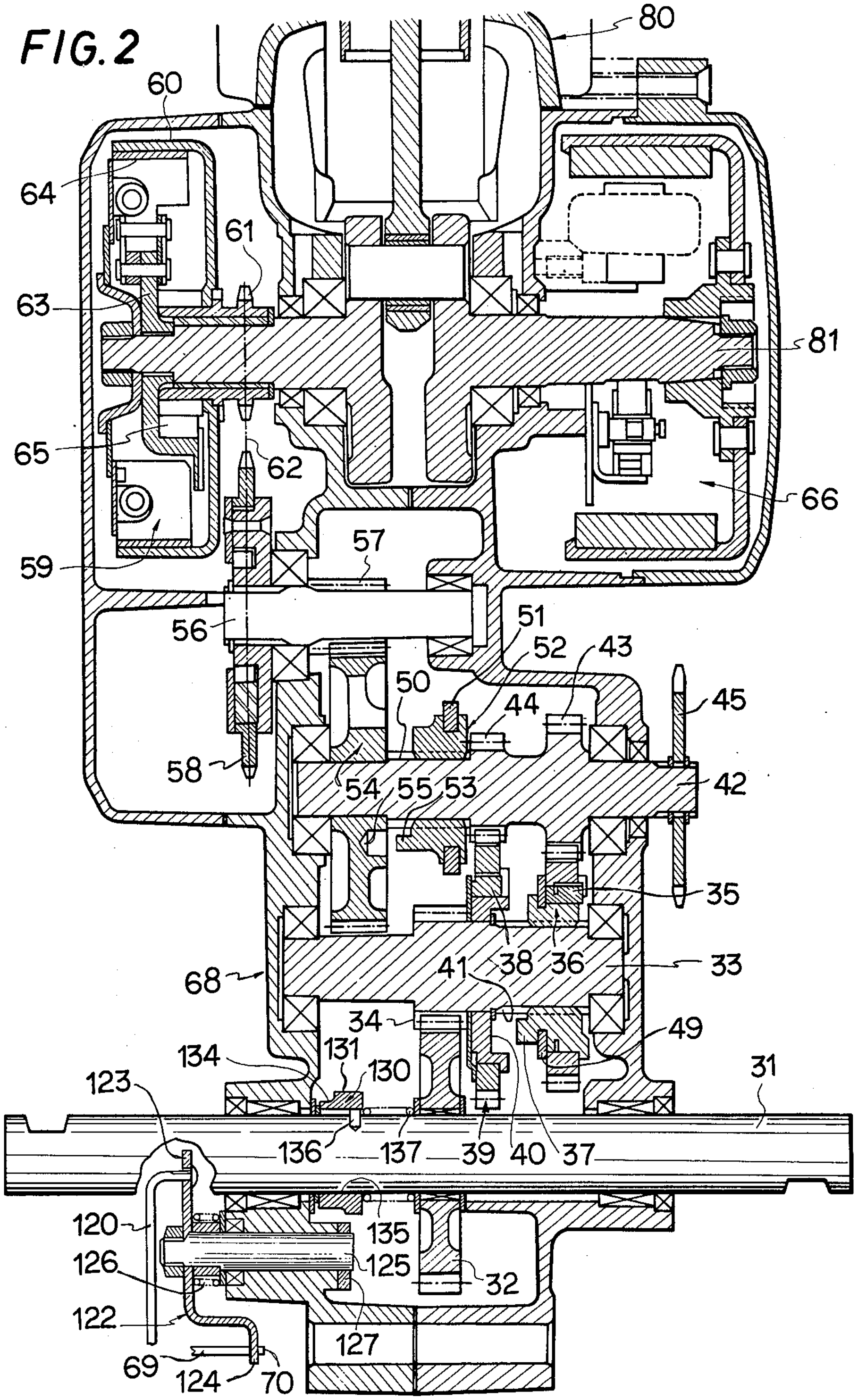
FIG. 2 is a cross-sectional plan view of FIG. 1, the respective parts of the power transmitting device being shown as if they were in the same plane (for convenience of explanation).

In FIG. 2, there is depicted a sectioned plan view in which respective shafts and gear power transmitting systems are arranged in a plane for the convenience of understanding. A starting or drive shaft 31 fitted with a pedal 30 (FIG. 9) at each of the right and left ends has a gear 32 which is provided in the middle portion meshed with a gear part 34 of an adjacent intermediate drive shaft 33 having thereon a low speed gear 36 and high speed gear 39 on the driving side provided respectively with one-way clutches 35 and 38 each transmitting a power only in one direction. The gears 36 and 39 mesh respectively with a low speed gear 43 and high speed gear 44 on the driven side of an adjacent output shaft 42.

In FIG. 2, the low speed gear 36 on the driving side is on the right side in the drawing and meshes with the gear 43 on the driven side and a projection 37 of a dogtooth clutch and a recess 40 of the high speed gear 39 provided respectively on the intermediate drive shaft 33 are not engaged with each other. Thus, a low speed automatic running will be achieved. When the low speed gear 36 is moved leftwardly by a first shift fork 49 on a spline 41 on the shaft 33 and the projection 37 and recess 40 engage with each other, the power of the high speed gear 39 will be transmitted to the high speed gear 44 of output shaft 42 and output shaft 42 will rotate at a high speed. The low speed rotation and high speed rotation of output shaft 42 will be transmitted through a sprocket 45 secured to output shaft 42 and will be transmitted to a chain 46 and a sprocket 48 of rear wheel 17 (FIG. 9).

A shifter 52 slid by the operation of a second shift fork 51 on a spline 50 is provided on the output shaft 42. Recesses 55 and projections 53 forming a dogtooth clutch are provided respectively on the shifter 52 and a changing gear 54 provided rotatably on the shaft 42 as opposed to the shifter 52. FIG. 2 shows same as separated from each other and the change grip 20 as in the OFF position in FIG. 10, i.e., in the position of the bicycle running. When change grip 20 is rotated to be set in position L in FIG. 10, shift fork 51 will be moved leftwardly in FIG. 2, projections 53 and recesses 55 will be engaged with each other, and the power of pedal drive shaft 31 will be transmitted to changing gear 54 to start the engine.

The changing gear 54 meshes with a gear part 57 of an intermediate shaft 56 provided parallel to the output shaft 42. The shaft 56 is connected through a sprocket 58 provided thereon and a chain 62 with a sprocket 61 provided on an outer member 60 of a centrifugal clutch 59 provided at one end of a crankshaft 81 of an engine 80. An inner member 63 of clutch 59 is provided with clutch shoes 64 of a centrifugally expanding type. A one-way clutch 65 is provided between members 60 and 63 to transmit the pedal power from the outer member 60 to inner member 63 to drive crankshaft 81 only at the time of starting the engine. A flywheel and such ignition devices as a magneto and contact are provided at the other end of the crankshaft 81. The output of engine 80 is transmitted to shaft 56 through clutch 59 and sprocket chain 62, and then to output shaft 42 through the gear part 57 and gear 54 and dogtooth clutch 55, 53.

Figure 6:
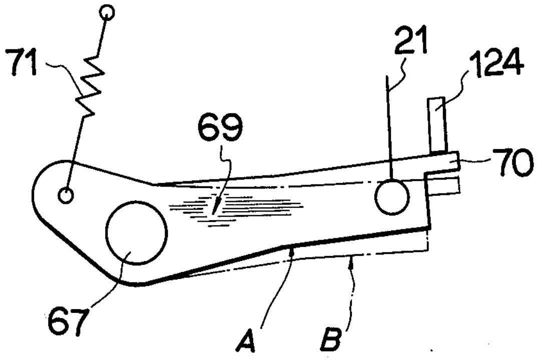
FIG. 6 is an explanatory view showing the relation between the speed changing operation system and the operating system of the decompressing device.

The shift forks 49 and 51 are operated by a rod 67 which is extended out of a case 68 containing the power transmitting device. A shift lever 69 connected with one end of change wire 21 operated by the change grip 20 is secured to this extension of rod 67. As shown in FIG. 6, the shift lever 69 is connected at one end to a return spring 71 and at the other end to change wire 21. With the operation of change grip 20, shift lever 69 has the position A shown by the solid line as a position in which the engine is off. The position B shown by the broken line and further rotating positions are positions in which the engine is on. In the OFF state, the bicycle is running and the pedal drive system and engine power system are separated from each other by the dogtooth clutch 53, 55.

Figure 1:
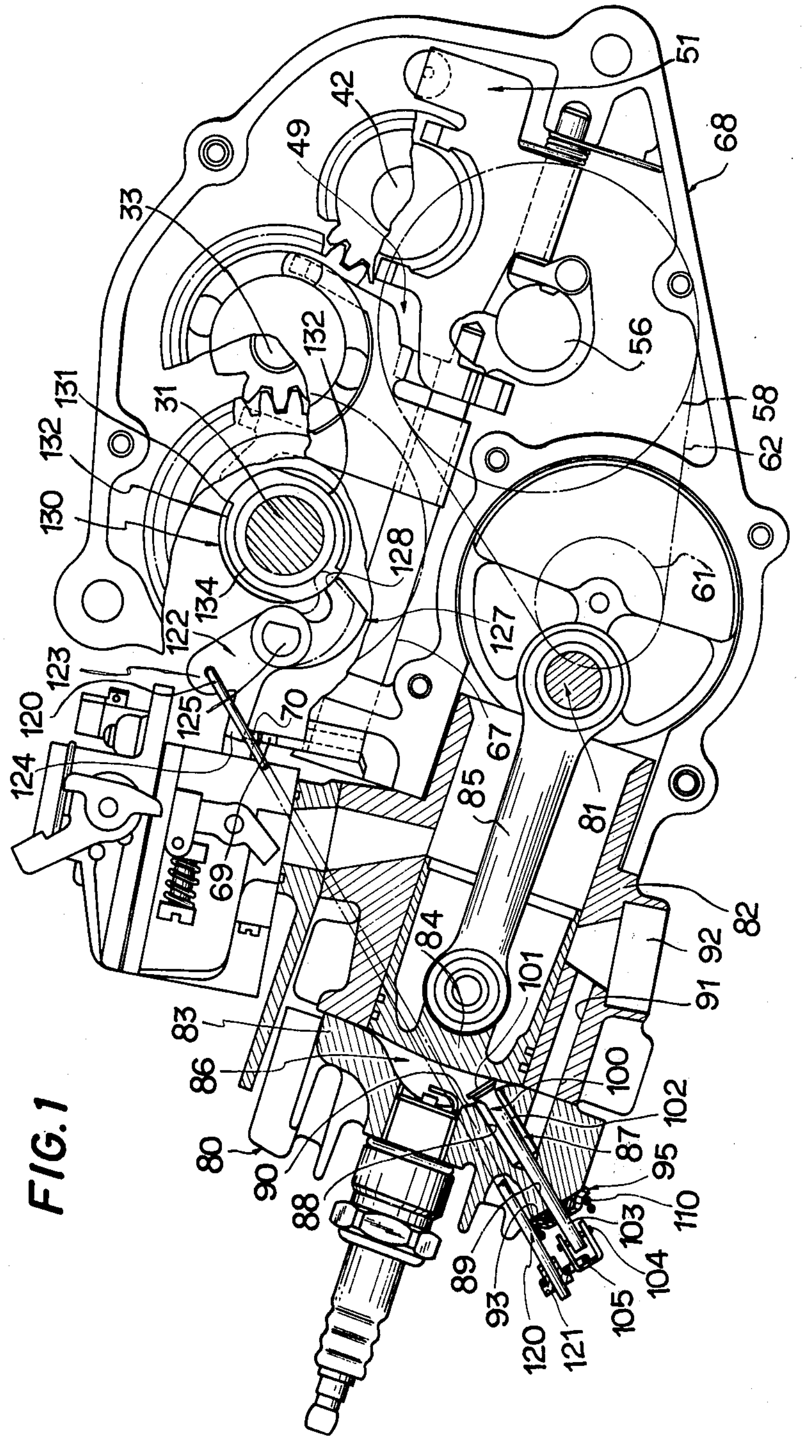
FIG. 1 is a sectioned side view of an engine including a decompressing device, the essential parts of the power transmitting device being sectioned.

In FIG. 1, the engine 80 is provided with a cylinder 82, cylinder head 83 and piston 84, which is connected with crankshaft 81 through a connecting rod 85. A through hole 87 connecting a combustion chamber 86 with the outside is provided in a part of cylinder head 83 and has a small diameter part 89 opening at one end to the outside of the cylinder head and a decompression passage 88 consisting of a large diameter part opening at the other end to the combustion chamber 86 with the intermediate portion providing a boundary. A valve seat 90 is provided in the part facing combustion chamber 86 of passage 88. The passage 88 communicates with an exhaust port 92 through a communicating passage 91 provided within cylinder 82.

Figure 3:
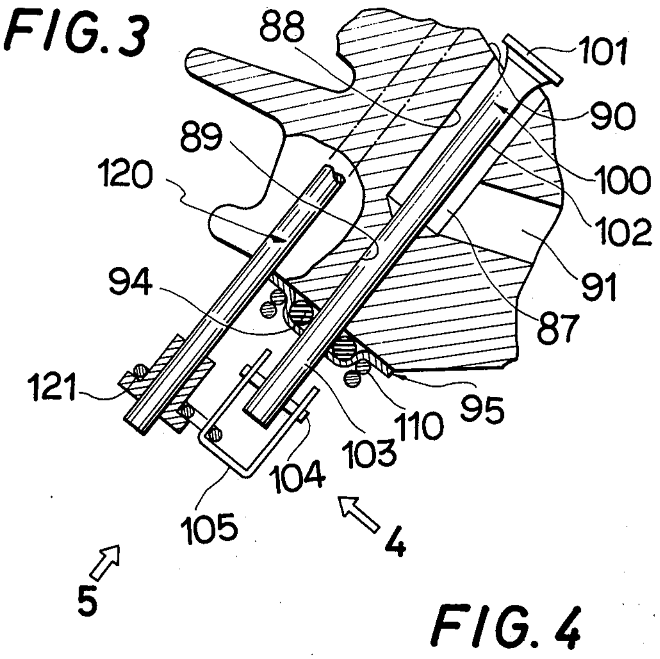
FIG. 3 is a magnified view of a portion of FIG. 1.

A decompression valve 100 is provided at the tip thereof with a valve body 101. A rod part 102 of substantially the same diameter is provided at the upper part of the valve body 101. The rod part 102 of the valve 100 is slidably fitted in through hole 87. The valve body 101 faces the valve seat 90, the tip part of the rod part 102 maintains a sufficient clearance from the inside wall of the decompression passage 88 and the base end part of the valve body 101 is extended out of cylinder head 83, slidably closely fitted in the small diameter part 89 connected with the clearance through it. A spring holder 105 is pivoted with a pin 104 to the end of an extension 103 of rod part 102, is channel-shaped in the end section as shown in FIGS. 1 and 3, and is provided to bridge the end part of extension 103.

Figure 4:
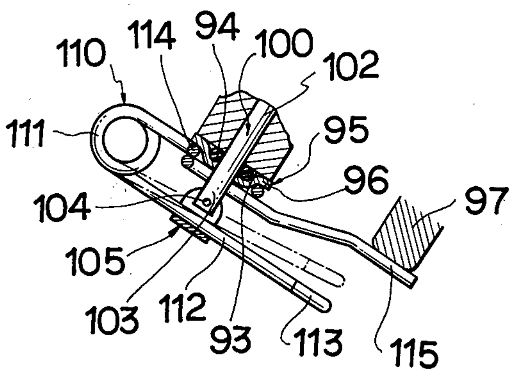
FIG. 4 is a sectioned view of FIG. 3 as seen in the direction indicated by the arrow 4.
Figure 5:
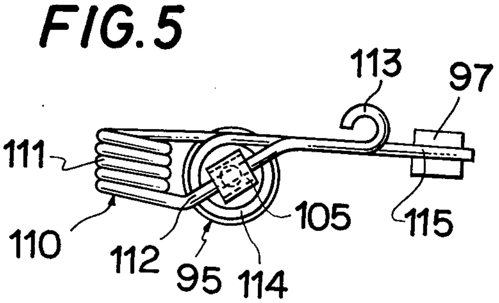
FIG. 5 is a view of FIG. 3 as seen in the direction indicated by the arrow 5.

As shown in detail in FIGS. 4 and 5, a coil spring 110 is provided for decompression valve 100. The coil part 111 of spring 110 is extended at one end. The intermediate part of a first extension 112 is inserted between spring holder 103 and rod extension 103, and is locked with holder 105. A cut circular locking part 113 is formed at the tip of extension 112 and is locked to one end of a link 120 (described hereinbelow). The coil part 111 is also extended at the other end to form a continued loop-shaped pressing part 114. A sealing member such as an O-ring 94 is applied to a flat seat surface 93 provided on the peripheral side of the part through which rod extension 103 projects of the cylinder head 83 and is covered with a flanged seat member 95. The loop-shaped pressing part 114 of spring 110 is applied onto the flange part 96 of the seat member 95 and the peripheral side part, i.e., flange part 96 of seat member 95, is resiliently pressed with pressing part 114 by the valve closing resiliency of spring 110 so that sealing member 94 may be pressed against seat surface 93 to seal it. The loop-shaped pressing part 114 is extended in the end part and the second extension 115 is contacted with a supporting part 97 provided adjacent to sealing surface 93. Thus, spring 110 closes decompression valve 100 and seals the part through which the rod part 102 projects of cylinder head 83.

The locking part 113 of spring 110 is locked to one end of a link 120 (FIG. 1) through a spring receiver 121. The link 120 is pivoted and connected at the other end to a lever 122 which is as shown in FIGS. 1 and 2. In FIG. 2, the lever 122 is shown as developed in a sectioned plan so as to be easily understood.

The lever 122 is connected and secured to an extension out of case 68 of a supporting shaft 125 rotatably borne adjacent to the pedal drive shaft 31 and is resiliently pressed in the axial direction outside the case with a spring 126 compressed and fitted between the side surface on the case side of lever 122 and the outside surface of case 68. The lever 122 is formed to be fork-shaped in a portion thereof. The link 120 is pivoted at one end to one leg 123 of the fork. The other leg 124 of the fork is made an operating piece which is mounted at the lower end, as shown in FIG. 6, on an extended piece 70 formed at one end of shift lever 69 to slidably engage them.

A regulating plate 127 which is a cam engaging piece is secured to the extension end into the case of a supporting shaft 125 provided with lever 122 at the extension end out of the case and is provided in the tip part thereof curved with a engaging part 128 as shown in FIG. 1.

On the adjacent pedal drive shaft 31, a cam 130 is provided axially slidably through a through hole 135 provided with a groove in the middle portion, and is regulated with a positioning pin 136 provided on shaft 31 as shown in FIG. 2. Cam 130 rotates integrally with shaft 31 and is resiliently pressed against one inside wall surface side of case 68 supporting shaft 31 by a spring 137 compressed and fitted between gear 32 and cam 130 on shaft 31.

Figure 7:
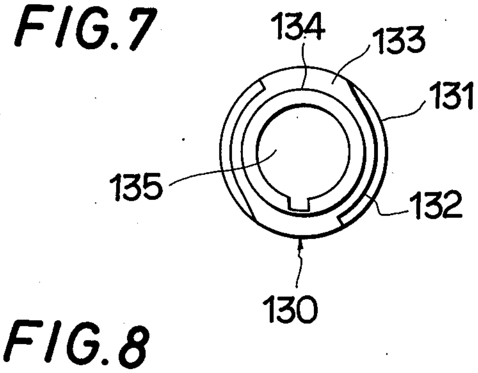
FIG. 7 is an elevational view of a cam.
Figure 8:
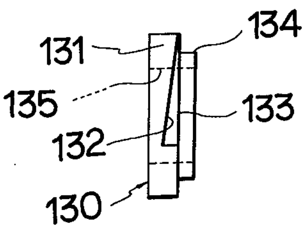
FIG. 8 is a side view of the cam.

The details of cam 130 are shown in FIGS. 7 and 8. FIG. 7 shows an elevation thereof, and FIG. 8 shows a side view thereof.

The cam 130 has two steps of outside diameters, a large diameter part 131 and small diameter part 134, which are integrally formed. The large diameter part 131 is provided with cam grooves 132. As shown in FIG. 8, the cam groove 132 starts from the intermediate portion in the width direction (axial direction) of large diameter part 131, inclines toward small diameter part 134 and joins the end surface 133 in the direction of small diameter part 134 on the end surface. As shown in FIG. 7, the cam groove 132 is provided over a predetermined angle on the periphery of large diameter part 131. In this embodiment, two of such cam grooves 132 are provided symmetrically, 180° opposed, on the periphery of large diameter part 131 so as to easily detect the decompressing operation in the rotation of the pedal drive shaft. When the engine is off, that is, at the time of the bicycle running, as shown in FIG. 2, cam 130 will be positioned on shaft 31 leftward by means of spring 137 and, as shown in FIG. 1, engaging part 128 of regulating plate 127 will be in contact in or near the starting point position of cam groove 132 on the periphery of large diameter part 131 or in any position on the periphery fitting said position.

The decompressing operation will now be explained. FIGS. 1, 2 and 6 depict a state at the time of the bicycle running, i.e., when the operation of engine 80 is stopped and decompression valve 100 is opened as separated from the valve seat 90, i.e., combustion chamber 86 is decompressed by communicating with the atmosphere through decompression passage 88, communicating passage 91 and exhaust port 92.

The change grip 20 will be in the OFF position in FIG. 10, the change wire 21 will be in the pulled position, and shift lever 69 connected with it will be set in the OFF position (position A in FIG. 6). Through rod 67 connected with shift lever 69, as shown in FIG. 2, the second shift fork 51 will set shifter 52 in the right OFF position on output shaft 42 so as to be separated from changing lever 54. Thus, only the power of pedal drive shaft 31 will be transmitted to output shaft 42 and a bicycle running will be made without operating the engine. In FIG. 2, shift fork 49 will set low speed gear 36 in the right low speed position, will mesh it with low speed gear 43 and will rotate output shaft 42 at a low speed with the pedal drive.

When shift lever 69 is in the OFF position, as shown in FIG. 6, it will lift the operating piece part 124 of lever 122 and lever 122 will rotate clockwise in FIG. 1 with supporting shaft 125 as a fulcrum, and will be in the OFF position. The regulating plate 127 provided commonly on supporting shaft 125 will rotate in the same direction and engaging part 128 at its tip will mount on the intermediate part in the width direction on the outer periphery of large diameter part 131 of cam 130. When lever 122 is set in the OFF position, link 120 will be pulled to be pushed down. As a result, spring 110 will flex toward cylinder head 83, rod 102 of decompression valve 100 locked in the intermediate portion of extension 112 of spring 110 will be pushed down, valve body 101 will enter combustion chamber 86 to clear valve seat 90, and combustion chamber 86 will communicate with the atmosphere as above-mentioned and will be decompressed. In the OFF state of the bicycle running, decompression valve 100 will be kept open. In this state, extension 115 of spring 110 will be regulated by supporting part 97 to prevent spring 110 from floating up.

In starting the engine, when change grip 20 is rotated to be set in position L shown in FIG. 10, with the relaxation of change wire 21, shift lever 69 will rotate clockwise in FIG. 6 through return spring 71 to be set in the ON position B and will rotate rod 67 in the same direction. With the rotation of rod 67, shift fork 51 will move shifter 52 leftwardly in FIG. 2, and its projections 53 will engage with recesses 55 on changing gear 54. Through the system of gear 54 and gear part 57 and sprocket 58 and 61, the power of pedal drive shaft 31 will be transmitted to clutch outer member 60 to drive same. The crankshaft 81 will be drive through one-way clutch 65 and clutch inner member 63.

When shift lever 69 is set in the ON position, the extension piece 70 will fall and operating piece part 124 of lever 122 in contact with it will be released and will tend to move lever 122 to return with the spring 110 through link 120. In this case, as mentioned above, engaging part 128 of regulating plate 127 will mount on the outer periphery of large diameter part 131 of cam 130 and the rotation of supporting shaft 25 will be regulated. Therefore, lever 122 will regulate link 120, decompression valve 100 will remain pushed down through spring 110, and will be in the decompressing state.

When the pedal driving force is transmitted to engine 80, crankshaft 81 will rotate but, as decompression valve 100 is open, combustion chamber 86 will be decompressed through decompression passage 88 and a decompressing operation will be performed.

The cam 130 will rotate integrally with the rotation of pedal drive shaft 31 and engaging part 128 of regulating plate 127 will engage with the starting point of cam groove 132. As the grooves 132 are disposed 180° opposing each other, this engagement will be made by a pedal rotation drive within at least 180°. With the engagement of engaging part 128 with cam groove 132, as cam groove 132 is as already described, by its guiding action, cam 130 will be moved rightwardly in FIG. 2 on shaft 31 against spring 137 and, at the terminal of the groove, engaging part 128 will reach small diameter part 134. Thereby, as a rotating resiliency is given counter-clockwise in FIG. 1 by the operation of spring 110 through link 120, the regulation of supporting shaft 125 will be released and lever 122 will rotate in said direction, engaging part 128 of regulating piece 127 will drop into small diameter part 134 of cam 130 and will release the regulation of link 120. The link 120 will release the regulation of spring 110. The rod part 102 of decompression valve 100 will be pulled by the resiliency of spring 110, valve body 101 will resiliently closely contact valve seat 90, decompression passage 88 will be closed, and the decompressing operation will be off.

Thus, in case the OFF state of the bicycle running is changed over to the ON state of the engine starting, the engine starting system will be immediately switched on but, within a predetermined rotation range of pedal drive shaft 31, decompression valve 100 will be opened by cam 130, the combustion chamber will be kept decompressed and, when a sufficient rotating inertia is given to crankshaft 81 by the pedal drive, the decompression will be released by cam 130 and the engine will be started. After the engine starts, centrifugal clutch 59 will act so that both the engine power and pedal drive may be transferred to output shaft 42.

As described above, the decompressing device is operatively connected with the shifting operation of changing the bicycle running over to the engine power running and the decompressing operation is automatically performed within a predetermined period in the initial starting period of the engine.

When change grip 20 is further rotated to be set in position H in FIG. 10, the first shift fork 49 will move leftwardly in FIG. 2. The gear 36 while remaining in mesh with gear 43 will engage with the adjacent high speed driving gear 39 through the dogtooth clutch 37, 40, gear 39 will be driven and high speed driven gear 44 will be driven to drive output shaft 42 at a high speed. In this case, gear 33 will escape through one-way clutch 35 and will not interfere, though in constant mesh with gear 43.

With the change of grip 20 from running with the engine power to bicycle running, the pedal drive system will be insulated from the engine power system, lever 122 will be set in the OFF position by shift lever 69 and link 120 will be pulled to open decompression valve 100.

In the above embodiment, at the time of starting the engine, the decompression is maintained by sliding the cam 130 but may be maintained by sliding regulating plate 127. Further, in the above, the explanation was set forth regarding pedal starting, however, even a kick starting system can be adopted. In such case, the above described mechanism may be provided on the kick-starting shaft.

The present invention has been explained in detail in the foregoing, and is believed to be able to be fully understood thereby.

We claim:

1. A decompressing device for a vehicle engine, comprising:

- a vehicle engine, said engine including a cylinder head;
- a decompression valve cooperating with said cylinder head, said decompression valve being resiliently pressed in the closing direction by a spring;
- said engine including a starting shaft for starting said engine, and further including means for switching said engine on and off;
- an operating member operatively connected to and operated in conjunction with said means for switching said engine on and off, and opening said decompression valve against said spring;
- a cam provided on said starting shaft coaxially with said operating member;
- the decompressing operation of said decompression valve being regulated and released through said operating member by relative movement with said cam;
- said cam being formed of two steps having large and small diameters to be provided with cam grooves guiding said regulating operating member from the large diameter part to the small diameter part; and
- said cam being provided on said starting shaft to be axially slidable while being rotated integrally with said starting shaft and resiliently pressed by a spring.

2. A decompressing device according to claim 1, wherein:

- said decompression valve includes a rod part;

said operating member comprises a lever;

said device includes a link connected at one end with said lever;

an extension out of said cylinder head of said rod part of said decompression valve and the end in the same direction of said link are connected with each other through said spring operating to resiliently press said decompression valve in said closing direction;

said spring is a coil spring;

the intermediate portion of a first extension of the coil part of said spring at one end thereof is engaged with said end of said extension out of said cylinder head of said decompression valve rod part;

the end part of said first extension of said spring is engaged with said end part in the same direction of said link;

said coil part includes a second extension at the other end thereof;

the end part of said second extension is locked on the cylinder head side with a sealing means sealing the peripheral side of the projection of said decompression valve rod part of said cylinder head with a loop-shaped pressing part provided between said coil part and said second extension end part; and said decompression valve is resiliently pressed in said valve closing direction and said sealing means is resiliently pressed in the sealing direction by the resiliency expanding said coil part of said spring.

3. A decompressing device according to claim 2, wherein:

the decompression rod part projecting peripheral side part of said cylinder head is made flat;

a sealing member is applied to the flat seat surface to enclose the periphery of said rod part; and a flanged seat member is applied onto said sealing member to be resiliently pressed toward said seat surface with said loop-shaped pressing part of said spring.

4. A decompressing device according to claim 1, wherein:

said cam grooves are provided to deviate in phase by 180° so that the decompressing operation may be made with the rotation of said starting shaft within 180°.

5. A decompressing device according to claim 1, wherein:

said switching means includes a shift lever for switching said engine on and off, and an engine power transmitting system;

said device further comprises:

a decompression valve rod resiliently pressed with said spring in said valve closing direction;

a connecting member operatively connected with said decompression valve rod;

a change grip;

an operating lever operated by said change grip, engaged with said shift lever for switching said engine on and off and said engine power transmitting system, provided coaxially with said regulating operating member, and connected with said connecting member;

said operating lever being disengaged by the operation of said shift lever switching off said engine; and the opening and closing operation of said decompression valve rod connecting member being released, and the valve closing operation of said operating lever being regulated during the guiding operation of said cam by rocking by said cam of said coaxial regulating operating member.

6. A decompressing device according to claim 1 for prime mover-equipped bicycles, wherein:

said decompression valve includes a decompression valve rod part;

said operating member comprises an operating lever;

said device further includes a link connected to said operating lever;

said switching means includes a shift lever for switching said engine on and off and an engine power transmitting system;

said starting shaft comprises a pedal drive shaft;

the end part of said decompression valve rod part is resiliently pressed in said direction of closing said valve;

said device further includes:

an extension out of said cylinder head of said decompression valve rod part;

a member sealing the peripheral side of said extension out of said cylinder head;

a spring resiliently pressing said sealing member in the sealing direction, said spring being locked at one end of said link, said link being connected at the other end to a part of said operating lever;

a change grip;

the other part of said lever being operated by said change grip and being locked to said shift lever;

a regulating member provided on said pedal drive shaft and rotating integrally with said pedal drive shaft, said regulating member being slidable in the axial direction and regulated in the rotation thereof by a cam resiliently pressed in the regulating direction; and said regulating member being connected coaxially and operatively with said operating lever so that said decompression valve may be operated to be opened and closed with said link operatively connected with said operating lever by the regulation and release by said cam of said regulating member and said shift lever.

* * * * *